(12) United States Patent
Martin (10) Patent No.: US 11,337,559 B2
(45) Date of Patent: May 24, 2022

(54) REMOVABLE HANDLES SYSTEM

(71) Applicant: Ariel Martin, North Bergen, NJ (US)

(72) Inventor: Ariel Martin, North Bergen, NJ (US)

( * ) Notice: Subject to any disclaimer, the term of this patent is extended or adjusted under 35 U.S.C. 154(b) by 289 days.

(21) Appl. No.: 16/654,213

(22) Filed: Oct. 16, 2019

(65) Prior Publication Data

US 2021/0113028 A1  Apr. 22, 2021

(51) Int. Cl.
*A47J 45/07* (2006.01)

(52) U.S. Cl.
CPC ...................... *A47J 45/07* (2013.01)

(58) Field of Classification Search
CPC ........ A47J 45/07; A47J 45/10; Y10T 16/4707
See application file for complete search history.

(56) References Cited

U.S. PATENT DOCUMENTS

| | | | |
|---|---|---|---|
| 152,866 A | 7/1874 | Preater | |
| 602,324 A | 4/1898 | Hautsch | |
| 2,220,879 A | 11/1940 | Hayden | |
| 2,577,676 A * | 12/1951 | Chance | A47J 45/10 294/33 |
| 4,241,946 A * | 12/1980 | Spoeth, Jr. | A47J 45/10 294/31.1 |
| 5,086,939 A | 2/1992 | Foulkes | |
| 5,887,751 A | 3/1999 | Kroscher | |
| 6,079,590 A * | 6/2000 | Munari | A47J 45/061 220/762 |
| 7,975,874 B2 * | 7/2011 | Scott | A47J 45/071 220/759 |
| 8,011,530 B2 * | 9/2011 | Kutsch | A47J 45/07 220/762 |
| 8,899,145 B2 * | 12/2014 | Harrison | A47J 37/0786 99/394 |
| 9,560,938 B2 * | 2/2017 | Dudda | B25B 9/02 |
| 2008/0006645 A1 * | 1/2008 | Sup | A47J 45/071 220/759 |
| 2012/0168455 A1 * | 7/2012 | Doyle | A47J 45/07 220/759 |
| 2014/0239654 A1 * | 8/2014 | Cuillery | A47J 45/10 294/31.1 |
| 2016/0045053 A1 * | 2/2016 | Cheng | A47J 45/10 220/573.1 |
| 2017/0280940 A1 * | 10/2017 | Quinn | A47J 45/071 |
| 2019/0174964 A1 * | 6/2019 | Lilljedahl | B25B 7/02 |

* cited by examiner

*Primary Examiner* — Victor D Batson
*Assistant Examiner* — Matthew J Sullivan (57) ABSTRACT

A removable handle assembly for a container having a side wall includes a container handle, a first removable handle and a locking mechanism. The locking mechanism is coupled to the first removable handle and automatically secures the first removable handle to the container handle. The locking mechanism includes a catch coupled to a rotatable shaft. The catch pivots with rotation of the shaft between a locked position and an unlocked position. When in the locked position, the at least one catch is positioned under a part of the container handle to deter wobbling or relative movement between the container handle and the first removable handle when the container handle is fixedly attached to a container.

17 Claims, 8 Drawing Sheets

REMOVABLE HANDLES SYSTEM

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISC APPENDIX

Not applicable.

BACKGROUND OF THE INVENTION

1. Field of the Invention

The present invention pertains to the field of removable or detachable handles, and more particularly to removable handles for cookware and the like.

2. Description of Related Art

Removable handles for cookware are well known. Pots and pans equipped with removable handles require less space, which facilitates cleaning, improves storability, and increases the safety of cooking operations since the container operational space is reduced once it is placed on the stove or oven and the handle is removed.

Existing designs of removable or detachable handles can be assigned to three distinctive groups based on the operational principle. The first group comprises those designs based on opposing jaws that grip the pan wall. Although there exist many variations within this group, they all exhibit severe limitations inherent to the underlying working principle: the limited contact area between the handle jaws and the pan wall renders the connection between the handle and the pan unstable, and the removable handle interferes with the pan lid.

The second group includes those designs based on a lug and a lug encompassing cavity. The coupling takes place by introducing the lug in the cavity and passively activating a locking mechanism. In the most common configuration the lug is in a bracket permanently mounted in the pan wall while the lug encompassing cavity is in the removable handle. However, a configuration where the lug encompassing cavity is in a bracket permanently mounted in the pan wall while the lug is in the removable handle is also possible. Although the designs within this group overcome the limitations from removable handles based on gripping opposing jaws, they have the disadvantage of requiring a bracket permanently attached to the pan wall for the sole purpose of enabling the connection with the removable handle.

Designs within the third group are less common and are based on the removable handle engaging the permanently attached pan side handle. Although these designs overcome the drawbacks inherent to removable handles based on gripping opposing jaws or lug-cavity coupling, it is difficult to smoothly incorporate a locking mechanism to secure the connection when the removable handle engages the pan side handles. As a result, most designs within this group lack a locking mechanism (e.g., U.S. Pat. Nos. 152,866; 602,324; 2,220,879; 5,086,939), which render the connection unsafe, or the pan side handles need to be significantly modified to accommodate the locking mechanism, which interferes with the primary function of the side handles (e.g., U.S. Pat. No. 5,887,751).

The present invention is based on a unique and simple design for a removable handles system that overcomes all previously mentioned limitations while fulfilling additional objectives: the removable handles are easy to manufacture, assemble, and use; include an intuitive and visible locking mechanism that provides additional cues for secure coupling; they allow the use of both hands which effectively reduces in half the effort required to handle a cooking vessel, a significant advantage when handling a heavy pot or for people with limited hand strength (e.g., older people or anyone suffering from a disability like arthritis).

BRIEF SUMMARY OF THE INVENTION

The present invention can be described as a removable handles system for attachment to cookware vessels. The removable handles system comprises, a main removable handle with horizontally and upwardly oriented hand grips to handle heavier pots using both hands, a secondary removable with a single horizontally oriented hand grip to handle lighter pots using one hand, and at least one side handle permanently attached to a cooking vessel and specially adapted to receive the removable handles. Both removable handles are based on similar designs where the hand grip end or hand grip ends are attached to a coupling end adapted to releasably engage a cooking vessel side handle and including a locking mechanism to secure the connection between the removable handle and the cooking vessel.

The cookware vessel includes at least one side handle permanently attached to the side wall and specially adapted to receive the removable handles. In a preferred embodiment of the invention the side handle includes a back plate near the vessel side wall, an upper plate opposite to the back plate and oriented perpendicularly to it, at least one arm connecting the back and upper plates and having a U-shaped notch, and two supporting brackets symmetrically located below the upper plate.

The coupling end in the removable handles is adapted to engage the U-shaped notch(s) and supporting brackets in the side handle and it includes a locking mechanism that automatically secures the connection between the main removable handle and the cooking vessel when two elbow catches attached to a pivoting shaft latch to the bottom surface of the side handle upper plate preventing any wobbling or relative movement between the main removable handle and the cooking vessel.

DETAILED DESCRIPTION OF THE INVENTION

Figure 1:
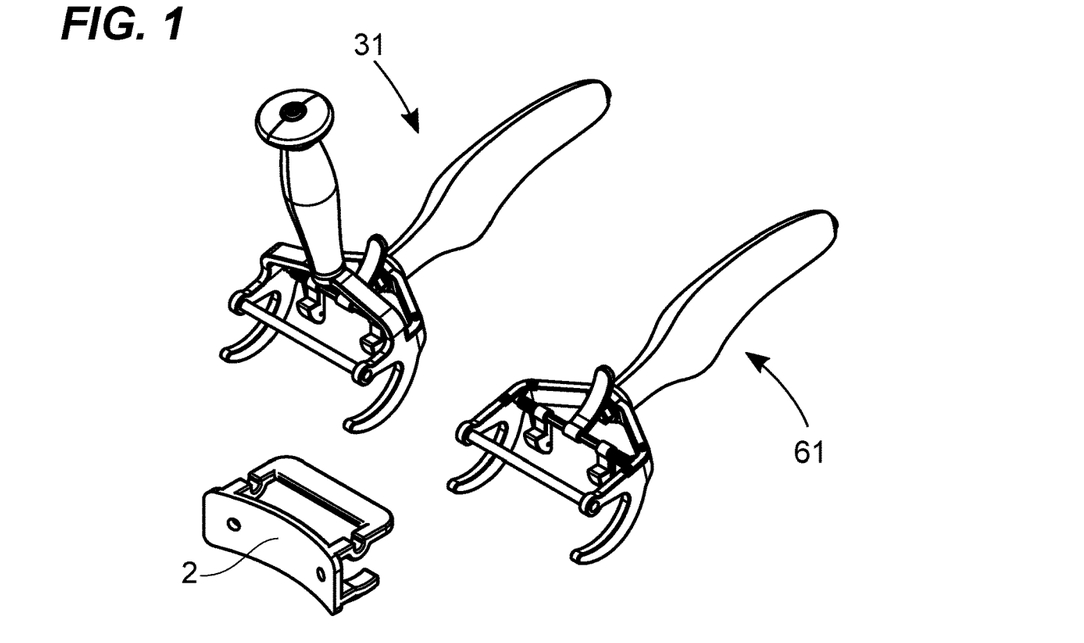
FIG. 1 is a perspective view of the elements of the removable handles: main removable handle, secondary removable handle, and cooking vessel side handle.
Figure 2:
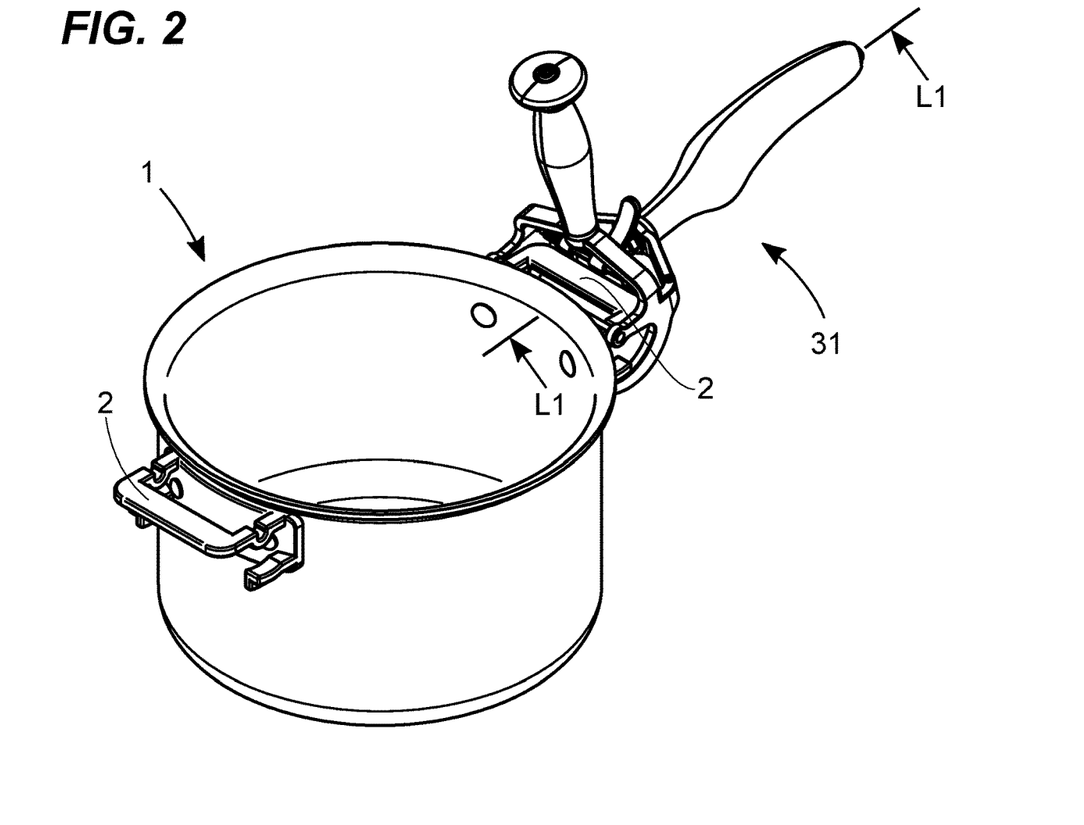
FIG. 2 is a perspective view of a cookware vessel with the main removable handle attached to one of its side handles.

FIG. 1 illustrates the elements of the removable handles system in a preferred embodiment of the invention: main removable handle 31, secondary removable handle 61, and cooking vessel side handle 2. FIG. 2 shows the main removable handle 31 attached to one side handle 2 of the cooking vessel 1.

Figure 3:
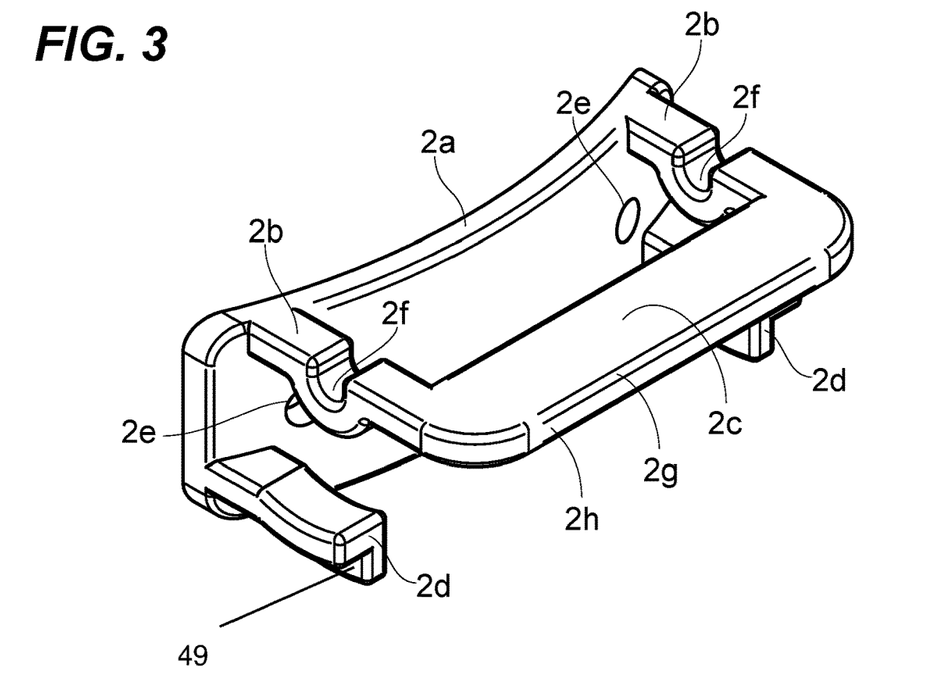
FIG. 3 is a perspective view of the cooking vessel side handle.
Figure 4:
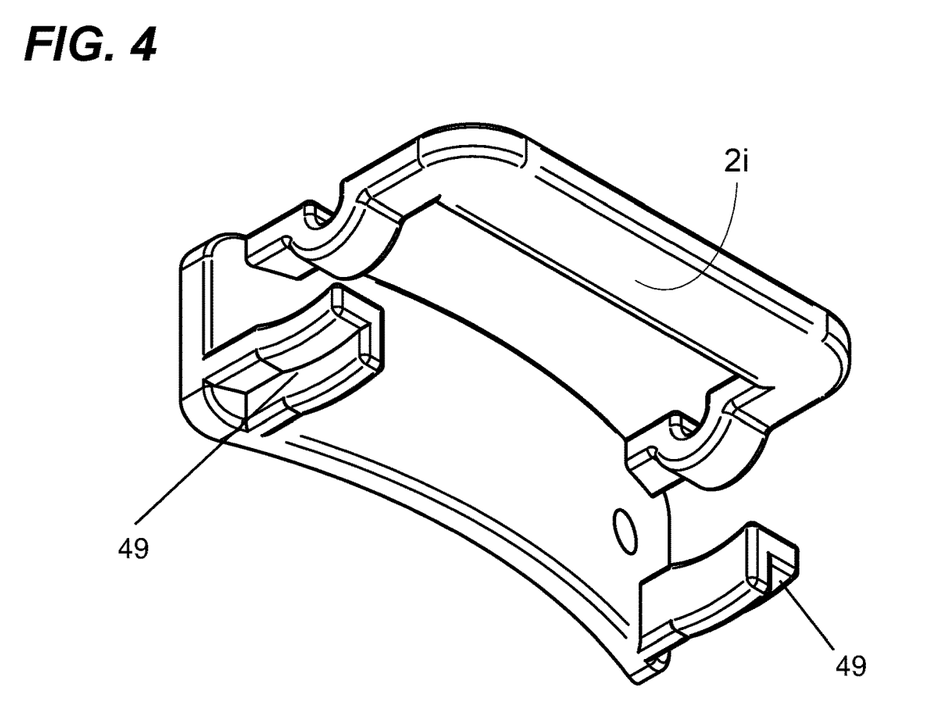
FIG. 4 is a bottom perspective view of the cooking vessel side handle.

As illustrated in FIG. 3, in the preferred embodiment of the invention, the cooking vessel side handle has a first end or back plate 2a that is attached to the pot exterior side wall with rivets (not showing) placed through the holes 2e, a second end or upper plate 2c (also referred to as the horizontal plate 2c) connected to the back plate 2a through the two arms 2b, and two supporting brackets 2d symmetrically located below the upper plate and directly connected to the back plate. The main removable handle is coupled to the side handle 2 through the two notches 2f located in the arms 2b, and the two supporting brackets 2d.

Figure 5:
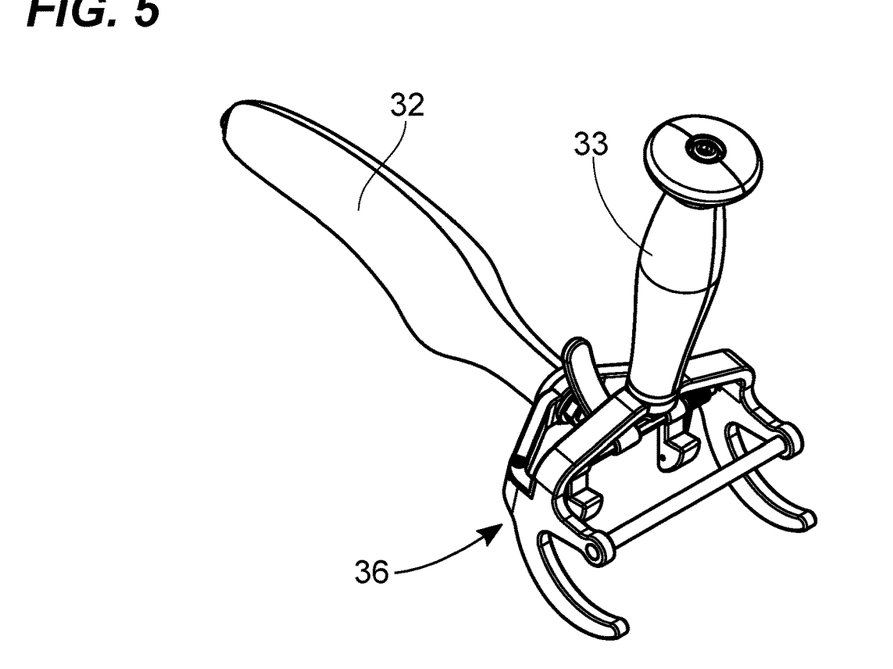
FIG. 5 is a perspective view of the main removable handle showing the coupling and hand grip ends.
Figure 6:
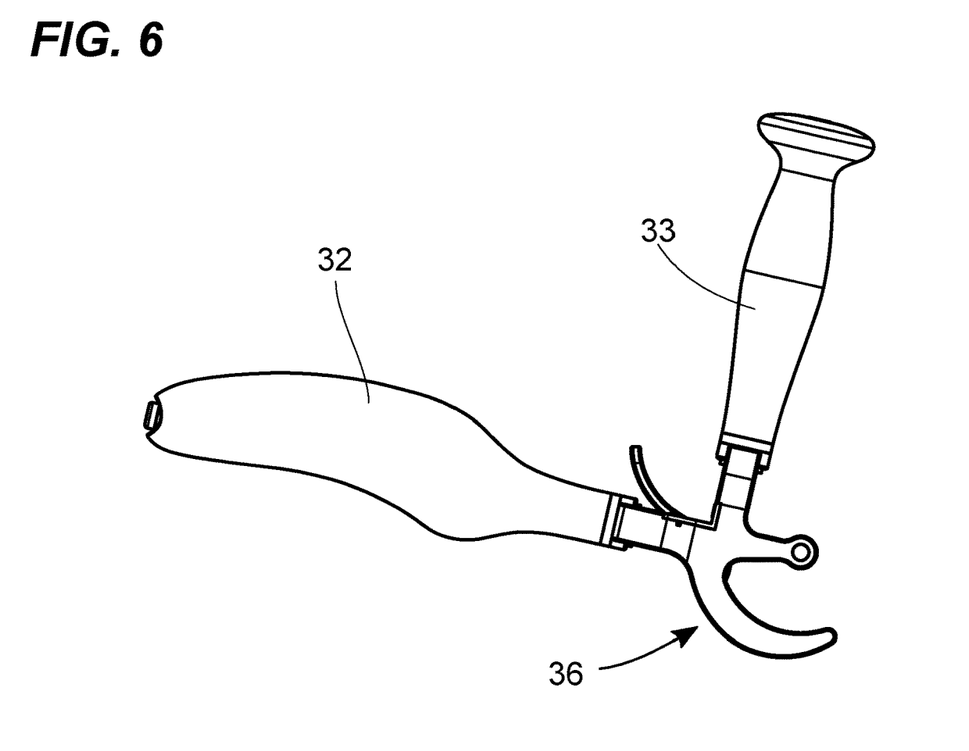
FIG. 6 is a side view of the main removable handle showing the coupling and hand grip ends.
Figure 7:
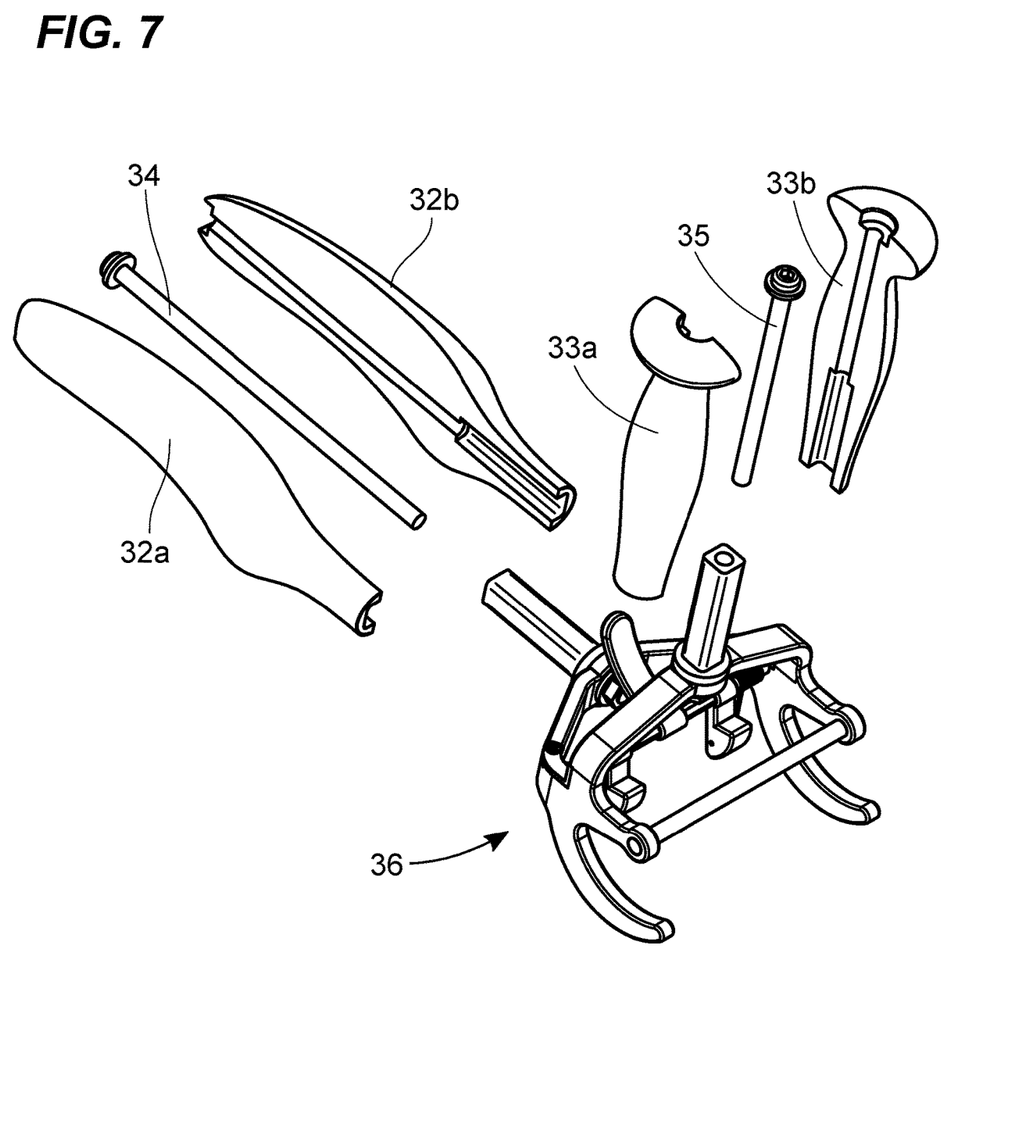
FIG. 7 is a perspective view of the main removable handle showing the coupling end and exploded hand grip ands. Each hand grip is intended to be single component but in the current figure they are split alongside and represented in an exploded fashion in order to visualize the supporting flanged screw that connects each hand grip with the coupling end.
Figure 8:
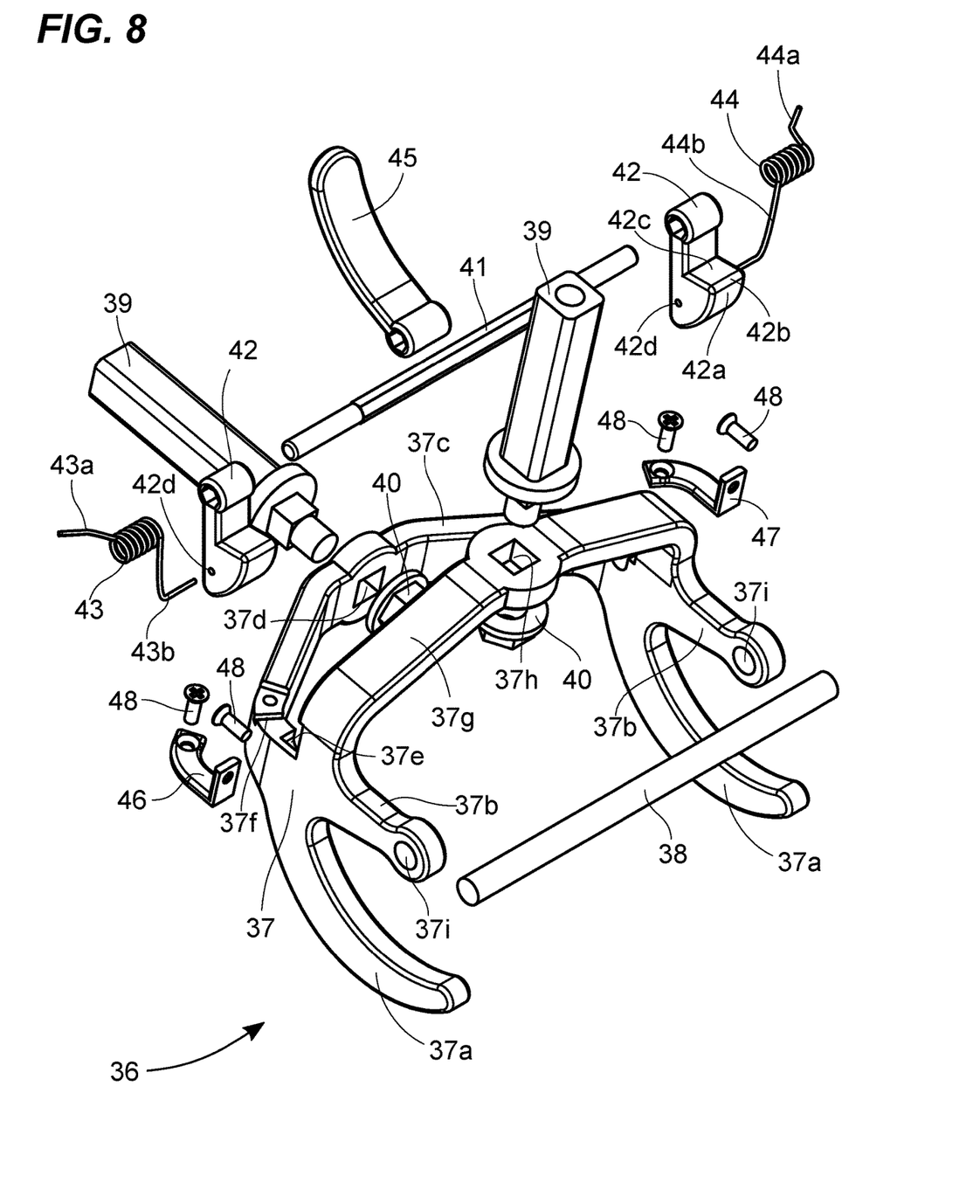
FIG. 8 is an exploded perspective view of the main removable handle coupling end.

As illustrated in FIGS. 5-6, the main removable handle comprises the vessel connecting or coupling end 36 (also referred to as the support member 36), the horizontally oriented handgrip 32, and the upwardly oriented handgrip 33. As shown in FIG. 7 the hand grip ends 32 and 33 are connected to the coupling end through the flanged screws 34 and 35, respectively. Each hand grip is intended to be a single component but in FIG. 7 they are split alongside and represented in an exploded fashion in order to visualize the supporting flanged screw that connects each hand grip to the coupling end. As shown in FIG. 8, the main removable handle coupling end includes the main body 37, the cylindrical bar 38 (also referred to as the second member 38), the two mounting bosses 39 with corresponding flanged nuts 40, and a locking mechanism to secure the main removable handle to the cooking vessel side handle. The locking mechanism comprises the shaft 41, the two elbow catches 42, the torsion springs 43 and 44, the release tab 45, the holding plates 46 and 47, and the four screws 48.

Integrally formed into the main body 37 are the hooks 37a (also referred to as the first member 37a), the arms 37b, and the bridges 37c and 37g. The flanged nuts 40 serve to fasten the mounting bosses 39 to the main body 37, while a square projection at the base of each mounting boss and the square openings 37d and 37h located in the middle of the bridges 37c and 37g, respectively, guarantee that the connections between the mounting bosses 39 and the main body 37 are rigid and do not allow any relative movement or wobbling between these elements. Using the flanged screw 34 the horizontally oriented handgrip 32 is joined to the mounting boss fasten to the bridge 37c while the upwardly oriented handgrip 33 is joined to the mounting boss fasten to the bridge 37i using the flanged screw 35. The openings 37g located in the extremes of the arms 37b allow to receive and rigidly weld the extremes of the cylindrical bar 38.

The locking mechanism comprises the shaft 41, the two elbow catches 42, the torsion springs 43 and 44, the release tab 45, the holding plates 46 and 47, and the four screws 48. The central shaft 41 includes a central hexagonal section and rounded extremes. In each extreme of the central shaft hexagonal section is welded an elbow catch while the release tab is welded in the middle. The hexagonal shape of the central section facilitates initial placing of the release tab and elbow catches while the rounded extremes allow winding the torsion springs 43 and 44 and pivoting about the notches 37e (only the left notch is shown in FIG. 8) located within the main body 37.

As shown in FIG. 8, the torsion springs 43 and 44 are wound around the left and right extremes, respectively, of the central shaft. The spring fixed legs, 43a and 44a, rest within the cavities 37f located within the main body 37 (only the left cavity is shown in FIG. 8) while the spring moving legs, 43a and 44a, are received by the orifices 42d drilled throughout the elbow catches 42. The holding plates 46 and 47 and the screws 48 serve to hold in place the spring fixed legs in the abovementioned cavities as well as the extremes of shaft 41 in the notches 37e.

As illustrated in FIG. 1, the main and secondary removable handles have similar designs and the main difference between the two is the presence of an additional upwardly oriented hand grip in the main removable handle. But both handles share the same horizontally oriented hand grip 32 and similar coupling ends. The coupling end in the secondary removable handle does not include the bridge 37 and for this reason the strips required to hold the locking mechanism in place need to be flat in contrast to the holding strips 46 and 47 from the main removable handle. Besides the abovementioned features, there are no other differences between the coupling ends of the main and secondary removable handles. Since both coupling ends share the same elements that participate in the attachment operations (hooks 37a, arms 37b with rigidly welded bar 38, and locking mechanism), the main and secondary removable handles are attached and secured to the cooking vessel side handle in the same way.

Figure 09:
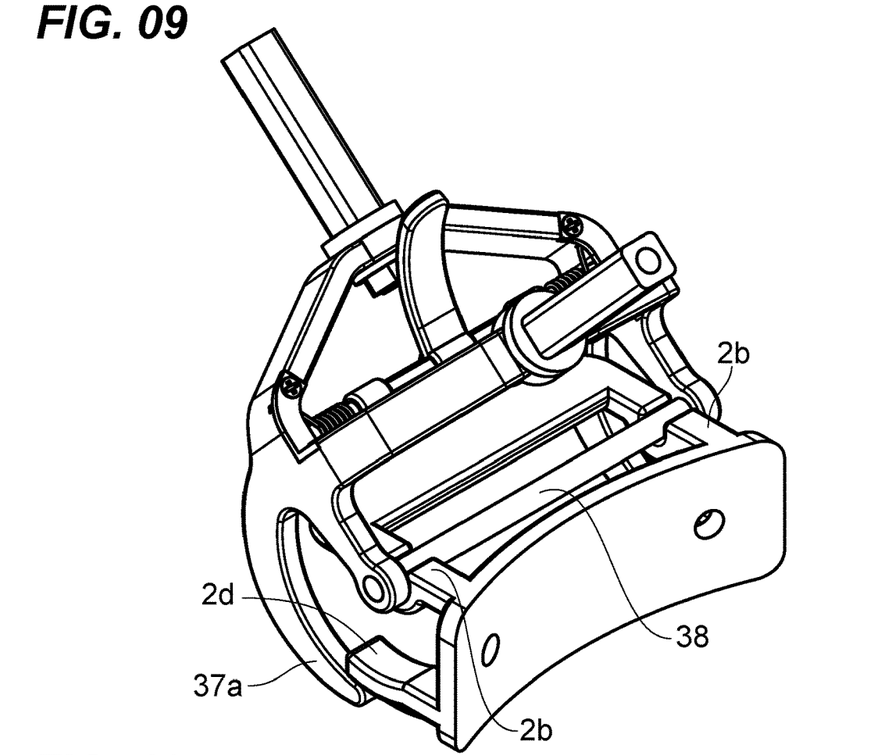
FIG. 9 is a perspective view of the side handle and main removable handle coupling end illustrating the initial stage of their attachment operation.
Figure 10:
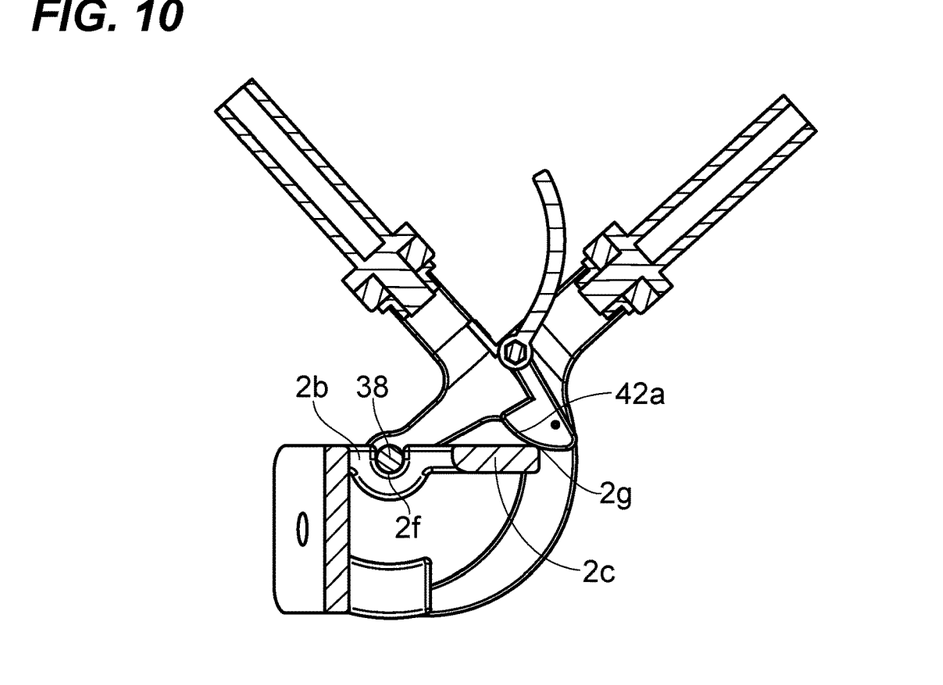
FIG. 10 is a cross-sectional view of the side handle and main removable handle coupling end taken generally along line L1-L1 of FIG. 2. The figure illustrates the initial stage of their attachment operation.
Figure 11:
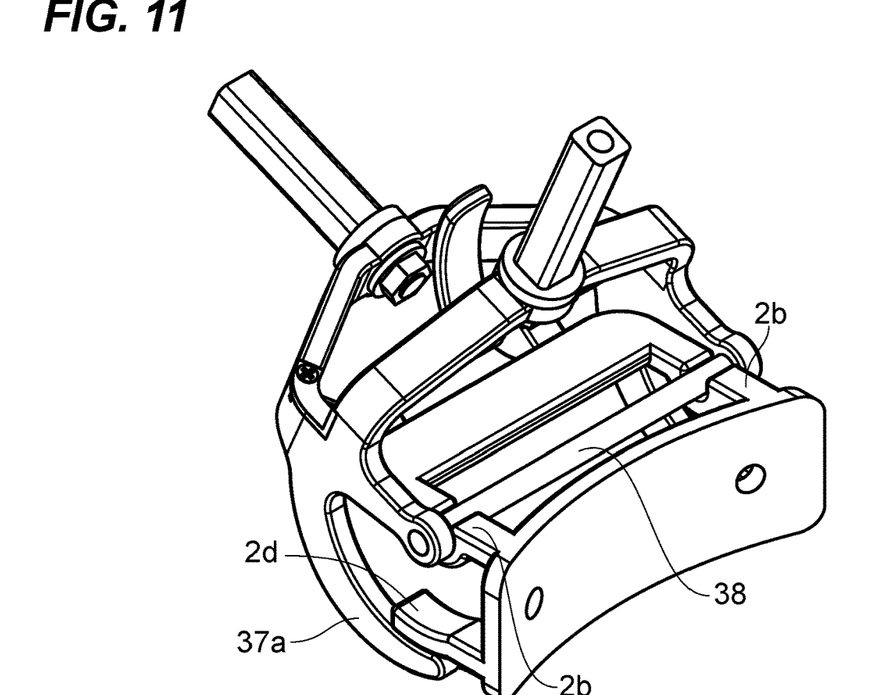
FIG. 11 is a perspective view of the side handle and main removable handle coupling end illustrating the middle stage of their attachment operation.
Figure 12:
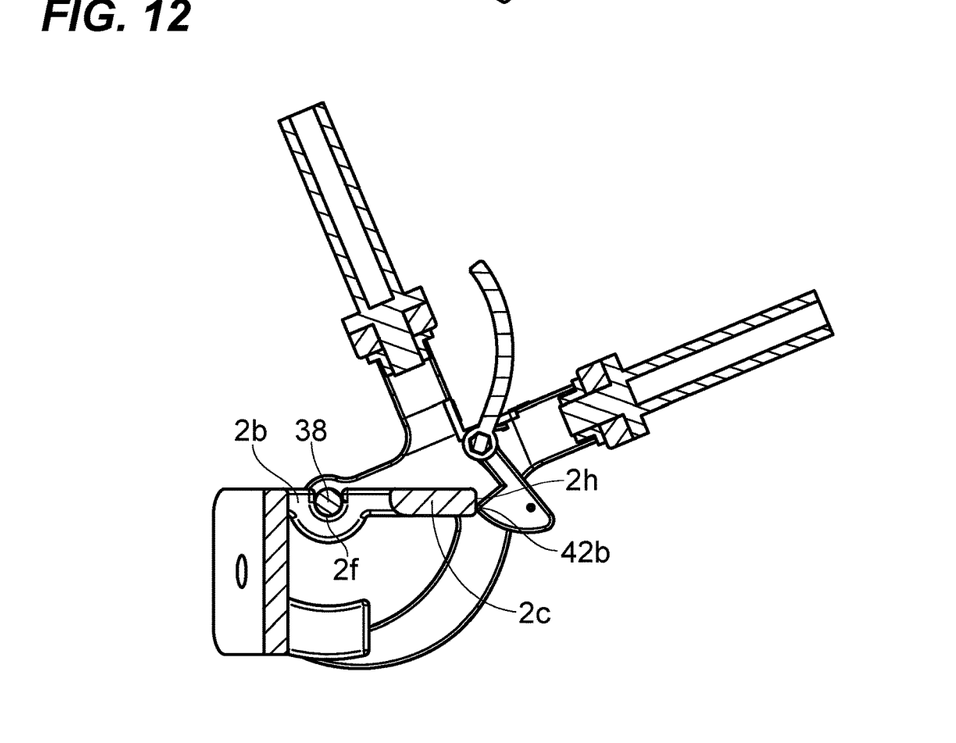
FIG. 12 is a cross-sectional view of the side handle and main removable handle coupling end taken generally along line L1-L1 of FIG. 2. The figure illustrates the middle stage of their attachment operation.
Figure 13:
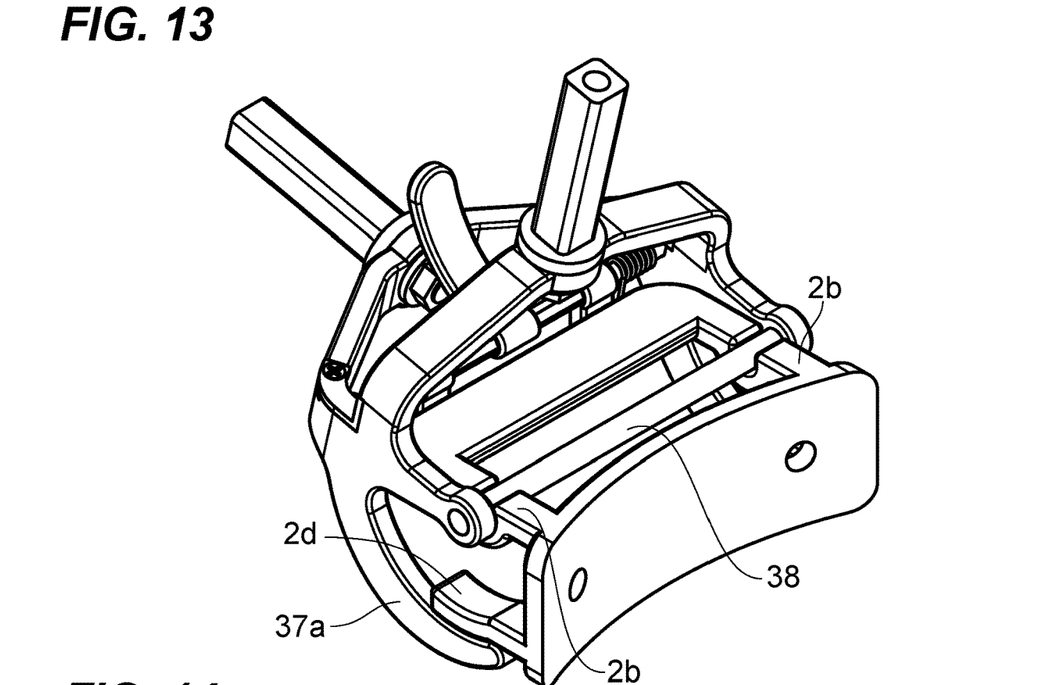
FIG. 13 is a perspective view of the side handle and main removable handle coupling end illustrating the final stage of their attachment operation.
Figure 14:
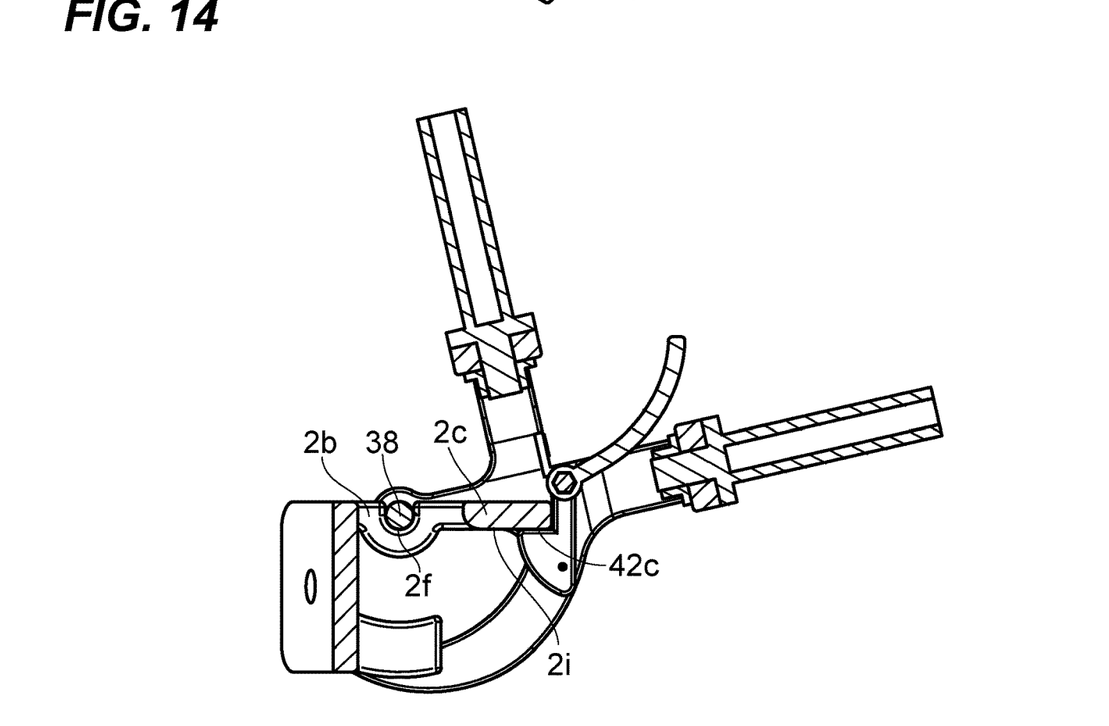
FIG. 14 is a cross-sectional view of the side handle and main removable handle coupling end taken generally along line L1-L1 of FIG. 2. The figure illustrates the final stage of their attachment operation.

The removable handles are attached to a vessel side handle 2 as follows. As shown in FIGS. 9-10, during the initial step of the attachment operation, the removable handle is tilted upwards and brought towards the cooking vessel side handle so that bar 38 rests in the side handle notches 2f, the hooks 37a engage the bottom of the side handle supporting brackets 2d, and the convex surfaces 42a of the elbow catches engage the side handle surface 2g while the torsion springs remain in their relaxed positions. The handle is then rotated downwards about bar 38 and as shown in FIGS. 11-12, in the middle step of the attachment operation the convex surfaces 42b of the elbow catches engage the side handle surface 2h forcing the shaft 41 to rotate counter clockwise and twisting the torsion springs 43 and 44. As shown in FIGS. 13-14, in the final locked position the side handle supporting brackets 2d prevent any further downward rotation of the removable handle about the bar 38 while the torsion springs return to their relaxed positions in which the flat surfaces 42c of the elbow catches are biased toward the lower surface 2i of the side handle upper plate preventing any upward rotation of the handle and hence also preventing the main removable handle from accidentally detaching from the cooking vessel side handle. In the final locked position, any wobbling of the main removable handle is also prevented since the side handle upper plate 2c is tightly abutted by the main removable handle arms 37b while the side handle brackets 2d are tightly abutted by the removable handle hooks 37a.

The removable handle is automatically or passively locked to the cooking vessel side handle in the final step of the attachment operation. The detachment operation, however, starts with actively unlocking the removable handle from the cooking vessel side handle by pushing the release tab 45 towards the cooking vessel side handle to overcome the opposing forces of the torsion springs and release the elbow catches from below the side handle upper plate. The removable handle is then rotated upwards about the bar 38 and once the main removable handle hooks 37a clear the side handle support brackets 2d the removable handle can be lifted upwards until bar 38 disengages the side handle notches 2f at which stage the detachment operation is complete.

In a first embodiment, a removable handle assembly for a container having a side wall includes a container handle, a first removable handle, and a locking mechanism. The container handle is for coupling to a side wall of a container. The handle includes a back plate, at least one arm, and at least one supporting bracket. The back plate is for positioning adjacent a side wall of a container. The at least one arm is connected to the back plate and extends outwardly from the back plate. The at least one arm has an upwardly facing notch. The at least one supporting bracket extends outwardly from the back plate and is positioned at a height on the back plate that is lower than a height of the at least one arm. The first removable handle is releasably coupled to the container handle and includes a substantially horizontally oriented hand grip member, a support member, a first member, and a second member. The support member is connected to the hand grip member. The first member is connected to the support member for coupling with the at least one supporting bracket. The second member is connected to the support member for seating in the notch of the at least one arm of the container handle. The locking mechanism is coupled to the support member of the first removable handle and automatically secures the first removable handle to the container handle. The locking mechanism includes at least one catch that is non-rotatably coupled to a rotatable shaft. The at least one catch pivots with rotation of the shaft between a locked position and an unlocked position. In the locked position, the at least one catch is positioned under a part of the container handle to deter wobbling or relative movement between the container handle and the first removable handle when the container handle is fixedly attached to a container.

The first removable handle may include a vertically extending hand grip extending from the support member. The vertically extending hand grip may extend substantially perpendicular to the horizontally oriented hand grip member. The catch may be an elbow catch. The catch may be coupled to a coil spring that exerts a force on the catch when in the locked position to assist in retaining the catch in a locked position. The coil spring may have two end sections, with one end section being connected to the catch and the other end being trapped in the support member. The catch may have a first edge that is convex and a second edge that is L-shaped. The catch may have a mating portion for mating with the shaft. The mating portion of the catch may have an inner hole that has a hexagonal cross-section for seating over the hexagonal cross-section of the inner section of the shaft.

The removable handle assembly may also include a release member for unlocking the locking mechanism. The release member may be coupled to the shaft of the locking mechanism.

The container handle may include two arms oppositely disposed and a horizontal plate positioned between the two arms. The horizontal plate may form a lower substantially flat surface for engaging with the at least one catch when in the locked position.

The first member may be hook shaped and configured to seat in a recess 49 defined in the at least one supporting bracket. The second member may be a horizontally extending bar that extends between opposite sides of the support member. The bar may be sized to seat in the at least one notch in the arm. The bar may be cylindrical in cross-section. The shaft may have an inner section and two outer sections at the outer extents of the shaft. The shaft may have a hexagonal cross-section in the inner section and a circular cross-section at the outer sections, with the shaft being rotatable upon the outer sections.

The support member of the first removable handle may include a curved upper bracket extending between sides of the support member and a curved rear bracket extending between sides of the support member. The curved rear bracket includes a mounting boss for coupling with the horizontally oriented hand grip member.

In another embodiment, a removable handle assembly for a container having a side wall includes a container handle, a first removable handle, and a locking mechanism. The container handle is for fixedly coupling to a side wall of a container and includes a back plate, two arms, two supporting brackets, and a horizontal plate. The back plate has a contoured shape for fixing the container handle directly adjacent a side wall of a container. The two arms extend outwardly from the back plate at opposite sides thereof. The arms each have an upwardly facing notch aligned with one another. The two supporting brackets extend outwardly from the back plate at opposite sides thereof and are positioned below the two arms. The horizontal plate is coupled between the two arms above the two supporting brackets. The horizontal plate has a substantially flat lower surface.

The first removable handle is releasably coupled to the container handle and includes a substantially horizontally oriented hand grip member, a support member, two arms, a horizontal bar, and two hook members. The support member is connected to the hand grip member. The support member has two arms positioned at opposite sides thereof and extends outwardly therefrom. The horizontal bar extends between the arms, with a width between the arms of the first removable handle being wider than a width between the arms of the container handle. The bar seats in the upwardly facing notches of the arms of the container handle. The two hook members extend from the support member and seat under the two supporting brackets of the container handle. The bar and arms of the first removable handle interact with the arms and supporting brackets of the container handle to hold the first removable handle in position on the container handle.

The locking mechanism is coupled to the support member of the first removable handle and automatically secures the first removable handle to the container handle. The locking mechanism includes two catches that are non-rotatably coupled to a rotatable shaft that is positioned on the support member. The catches pivot with rotation of the shaft between a locked position and an unlocked position. In the locked position, the at least one catch is positioned under the horizontal plate of the container handle to deter wobbling or relative movement between the container handle and the first removable handle.

Each of the catches may be biased by a spring. The springs may be positioned at opposite ends of the rotatable shaft and trapped between the respective catch member at one end and the support member at the other end.

The spring may be a coil spring that has two free ends. The catch members may each have a hole for receiving an end of the biasing spring. The support member may have a channel for receiving an opposite end of the biasing spring, with the channel being covered by a holding plate.

The arms and the hooks of the first removable handle are vertically aligned. An open space is provided between the arms and between the hooks.

The support member of the first removable handle may include a curved upper bracket extending between sides of the support member and a curved rear bracket extending between sides of the support member. The curved rear bracket may include a mounting boss for coupling with the horizontally oriented hand grip member.

The removable handle assembly may also include a vertically oriented hand grip coupled to the removable handle assembly. The vertically oriented hand grip may be oriented substantially perpendicular to the horizontally oriented hand grip. The upper bracket of the support member may include a mount for mounting the vertically oriented hand grip on the support member.

In yet another embodiment, a removable handle assembly for a container having a side wall includes a container handle, one or both of a first removable handle and a second removable handle, and a locking mechanism. The container handle is coupled to a side wall of a container. The container handle includes a back plate for positioning adjacent a side wall of a container. The at least one arm is connected to the back plate and extends outwardly from the back plate. The at least one arm has an upwardly facing notch. The at least one supporting bracket extends outwardly from the back plate and is positioned at a height on the back plate that is lower than a height of the at least one arm.

The first removable handle is for releasably coupling to the container handle and includes a substantially horizontally oriented hand grip member. The support member is connected to the horizontally oriented hand grip member. The first member is for coupling with the at least one supporting bracket. The second member is for seating in the notch of the at least one arm.

The second removable handle is for releasably coupling to the container handle and includes a substantially horizontally oriented hand grip member. A support member is connected to and supports the horizontally oriented hand grip member. A vertically oriented hand grip member is connected to the support member. A first member is for coupling with the at least one supporting bracket. A second member is for seating in the notch of the at least one arm. Each of the first removable handle and second removable handle further include a locking mechanism coupled to the support member thereof that automatically secures the first and/or second removable handle to the container handle. The locking mechanism includes at least one catch that is non-rotatably coupled to a rotatable shaft. The at least one catch pivots with rotation of the shaft between a locked position and an unlocked position. In the locked position, the at least one catch is positioned under a part of the container handle to deter wobbling or relative movement between the container handle and the first and/or second removable handles.

The term "substantially," if used herein, is a term of estimation.

While various features are presented above, it should be understood that the features may be used singly or in any combination thereof. Further, it should be understood that variations and modifications may occur to those skilled in the art to which the claimed examples pertain. The examples described herein are exemplary. The disclosure may enable those skilled in the art to make and use alternative designs having alternative elements that likewise correspond to the elements recited in the claims. The intended scope may thus include other examples that do not differ or that insubstantially differ from the literal language of the claims. The scope of the disclosure is accordingly defined as set forth in the appended claims.

What is claimed is:

1. A removable handle assembly for a container having a side wall comprising:
    a container handle for coupling to a side wall of a container, the handle including a back plate for positioning adjacent a side wall of a container, one or more container handle arms connected to the back plate and extending outwardly from the back plate, the one or more container handle arms having an upwardly facing notch, and at least one supporting bracket extending outwardly from the back plate and positioned at a height on the back plate that is lower than a height of the one or more container handle aims;
    a first removable handle releasably coupled to the container handle and including a substantially horizontally oriented hand grip member, a support member connected to the hand grip member, a first member connected to the support member for coupling with the at least one supporting bracket, and a second member connected to the support member for seating in the notch of the one or more container handle arms; and
    a locking mechanism coupled to the support member of the first removable handle that automatically secures the first removable handle to the container handle, the locking mechanism including at least one catch that is non-rotatably coupled to a rotatable shaft, with the at least one catch pivoting with rotation of the shaft between a locked position and an unlocked position, wherein in the locked position, the at least one catch is positioned under a part of the container handle to deter wobbling or relative movement between the container handle and the first removable handle when the container handle is fixedly attached to a container;
    wherein the first removable handle includes a vertically extending hand grip extending from the support member, with the vertically extending hand grip extending substantially perpendicular to the horizontally oriented hand grip member.

2. The removable handle assembly of claim 1, wherein the catch is an elbow catch.

3. The removable handle assembly of claim 1, further comprising a release member for unlocking the locking mechanism, the release member being coupled to the shaft of the locking mechanism.

4. The removable handle assembly of claim 1, wherein the one or more arms comprises two container handle arms that are oppositely disposed and a horizontal plate positioned between the two container handle arms, with the horizontal plate forming a lower substantially flat surface for engaging with the at least one catch when in the locked position.

5. The removable handle assembly of claim 1, wherein the catch is coupled to a coil spring that exerts a force on the catch when in the locked position to assist in retaining the catch in a locked position.

6. The removable handle assembly of claim 5, wherein the coil spring has two end sections, with one end section being connected to the catch and the other end being trapped in the support member.

7. A removable handle assembly for a container having a side wall comprising:
a container handle for coupling to a side wall of a container, the handle including a back plate for positioning adjacent a side wall of a container, one or more container handle arms connected to the back plate and extending outwardly from the back plate, the one or more container handle arms having an upwardly facing notch, and at least one supporting bracket extending outwardly from the back plate and positioned at a height on the back plate that is lower than a height of the one or more container handle arms;
a first removable handle releasably coupled to the container handle and including a substantially horizontally oriented hand grip member, a support member connected to the hand grip member, a first member connected to the support member for coupling with the at least one supporting bracket, and a second member connected to the support member for seating in the notch of the one or more container handle arms; and
a locking mechanism coupled to the support member of the first removable handle that automatically secures the first removable handle to the container handle, the locking mechanism including at least one catch that is non-rotatably coupled to a rotatable shaft, with the at least one catch pivoting with rotation of the shaft between a locked position and an unlocked position, wherein in the locked position, the at least one catch is positioned under a part of the container handle to deter wobbling or relative movement between the container handle and the first removable handle when the container handle is fixedly attached to a container;
wherein the first member is hook shaped and configured to seat in a recess defined in the at least one supporting bracket.

8. The removable handle assembly of claim 1, wherein the second member is a horizontally extending bar that extends between opposite sides of the support member, and the bar is sized to seat in the at least one notch in the one or more container handle arms.

9. The removable handle assembly of claim 8, wherein the bar is cylindrical in cross-section, the shaft has an inner section and two outer sections at the outer extents of the shaft, with the shaft having a hexagonal cross-section in the inner section and a circular cross-section at the outer sections, with the shaft being rotatable upon the outer sections.

10. The removable handle assembly of claim 1, wherein the catch has a first edge that is convex and a second edge that is L-shaped.

11. The removable handle assembly of claim 9, wherein the catch has a mating portion for mating with the shaft, and the mating portion of the catch has an inner hole that has a hexagonal cross-section for seating over the hexagonal cross-section of the inner section of the shaft.

12. The removable handle assembly of claim 1, wherein the support member of the first removable handle includes a curved upper bracket extending between sides of the support member and a curved rear bracket extending between sides of the support member, with the curved rear bracket including a mounting boss for coupling with the horizontally oriented hand grip member.

13. A removable handle assembly for a container having a side wall comprising:
a container handle for fixedly coupling to a side wall of a container, the handle including a back plate having a contoured shape for fixing the container handle directly adjacent a side wall of a container, two container handle arms extending outwardly from the back plate at opposite sides thereof, with the two container handle arms each having an upwardly facing notch aligned with one another, two supporting brackets extending outwardly from the back plate at opposite sides thereof and positioned below the two container handle arms, and a horizontal plate coupled between the two container handle arms above the two supporting brackets, said horizontal plate having a substantially flat lower surface;
a first removable handle releasably coupled to the container handle and including a substantially horizontally oriented hand grip member, a support member connected to the hand grip member, said support member having two support member arms positioned at opposite sides thereof and extending outwardly therefrom, with a horizontal bar extending between the two support member arms, with a width between the two support member arms of the first removable handle being wider than a width between the two container handle arms, with the bar for seating in the upwardly facing notches of the two container handle arms, two hook members extending from the support member for seating under the two supporting brackets of the container handle, said bar and two container handle arms interacting with the two support member arms and supporting brackets of the container handle to hold the first removable handle in position on the container handle; and
a locking mechanism coupled to the support member of the first removable handle that automatically secures the first removable handle to the container handle, the locking mechanism including two catches that are non-rotatable coupled to a rotatable shaft that is positioned on the support member, with the catches pivoting with rotation of the shaft between a locked position and an unlocked position, wherein in the locked position, the at least one catch is positioned under the horizontal plate of the container handle to deter wobbling or relative movement between the container handle and the first removable handle;
wherein the support member of the first removable handle includes a curved upper bracket extending between sides of the support member and a curved rear bracket extending between sides of the support member, with the curved rear bracket including a mounting boss for coupling with the horizontally oriented hand grip member.

14. The removable handle assembly of claim 13, further comprising a vertically oriented hand grip coupled to the removable handle assembly, with the vertically oriented hand grip being oriented substantially perpendicular to the horizontally oriented hand grip, with the upper bracket of the support member including a mount for mounting the vertically oriented hand grip on the support member.

15. The removable handle assembly of claim 13, wherein the each of the catches is biased by a spring, with the springs being positioned at opposite ends of the rotatable shaft and trapped between the respective catch member at one end and the support member at the other end.

16. The removable handle assembly of claim 15, wherein the spring is a coil spring that has two free ends, and the catch members each have a hole for receiving an end of the biasing spring, and the support member has a channel for receiving an opposite end of the biasing spring, with the channel being covered by a holding plate.

17. The removable handle assembly of claim 13, wherein the two support member arms and the hooks of the first removable handle are vertically aligned, and an open space is provided between the two support member arms and between the hooks.

\* \* \* \* \*